(12) United States Patent
McMullen (10) Patent No.: US 7,112,108 B2
(45) Date of Patent: Sep. 26, 2006

(54) WATER CRAFT

(76) Inventor: Bruce William James McMullen, 15 Cocos Avenue, Eastwood, New South Wales 2122 (AU)

( * ) Notice: Subject to any disclaimer, the term of this patent is extended or adjusted under 35 U.S.C. 154(b) by 0 days.

(21) Appl. No.: 11/211,435

(22) Filed: Aug. 26, 2005

(65) Prior Publication Data

US 2006/0042531 A1    Mar. 2, 2006

(30) Foreign Application Priority Data

| Aug. 27, 2004 | (AU) | .............................. 2004904886 |
| Aug. 27, 2004 | (AU) | .............................. 2004904887 |
| Nov. 10, 2004 | (AU) | .............................. 2004906430 |

(51) Int. Cl.
*B63H 16/00* (2006.01)

(52) U.S. Cl. ...................... 440/22; 114/61.1

(58) Field of Classification Search ................ 440/21, 440/22; 441/76; 114/61.1
See application file for complete search history.

(56) References Cited

U.S. PATENT DOCUMENTS

| 817,810 A | | 4/1906 | Sheen | |
| 907,303 A | * | 12/1908 | Wilkens | ................... 114/61.1 |
| 1,204,937 A | | 11/1916 | Carley | |
| 1,324,397 A | | 12/1919 | Hobart | |
| 2,873,713 A | * | 2/1959 | Baastrup | ...................... 440/21 |
| 3,086,492 A | | 4/1963 | Holley | |
| 3,640,240 A | | 2/1972 | Stein | |
| 4,098,219 A | | 7/1978 | Tesan | |
| 4,193,371 A | | 3/1980 | Baulard-Caugan | |
| 4,892,493 A | | 1/1990 | Gil | |
| 4,968,273 A | | 11/1990 | Momot | |
| 5,441,454 A | * | 8/1995 | Race | ........................... 440/21 |
| 5,462,466 A | * | 10/1995 | Hull et al. | .................... 440/22 |
| 6,595,813 B1 | | 7/2003 | Lekhtman | |
| 6,755,706 B1 | | 6/2004 | Lin | |

FOREIGN PATENT DOCUMENTS

| CA | 2219471 A | 6/1999 |
| DE | 3141738 A | 7/1983 |
| GB | 992948 | 5/1965 |
| GB | 2212467 A | 7/1989 |

* cited by examiner

*Primary Examiner*—Lars A. Olson
(74) *Attorney, Agent, or Firm*—Connolly Bove Lodge & Hutz LLP (57) ABSTRACT

A watercraft (10, 40, 60, 90, 110, 200, 210, 310) is disclosed which is propelled by at least one pair of pivoted sheets (28, 29) which are reciprocated through the water by a propulsion mechanism (18, 25, 45, 48, 91, 92) which is driven by repeated weight transfer of an operator's body (20). Also disclosed is a hull assembly system (61, 161, 261). The water craft disclosed are particularly suited as pleasure craft able to be transported by a vehicle and operated by many classes of persons including those without endurance or stamina.

20 Claims, 11 Drawing Sheets

WATER CRAFT

FIELD OF THE INVENTION

The present invention relates to water craft which float above the water and are propelled by muscular exertion by one or more occupants carried by the craft. Thus the invention relates generally to water craft which are propelled by means of one or more oars or paddles, but excludes watercraft propelled by means of sails or an engine.

BACKGROUND ART

There have been many proposals over the years to propel water craft by means of an oar like arrangement with two flaps which are pivoted about an axis. A stop member is provided so that as the flaps move forwardly, the flaps are closed by their forward movement through the water. However when the flaps move rearwardly, the flaps open against the stop member and the large surface moving rearwardly through the water propels the watercraft forwardly. The following prior art specifications are representative of this art.

U.S. Pat. No. 817,810 (SHEEN-1906)
U.S. Pat. No. 1,204,937 (CARLEY-1916)
U.S. Pat. No. 1,324,397 (HOBART-1919)
U.S. Pat. No. 4,098,219 (TESAN)
U.S. Pat. No. 4,892,493 (GILL)
GB 992,948 (BECKETT)
CA 2,219,471A (BOYLAN)
DE 3,141,738A (BLUEGGEL)

To the best of the applicant's knowledge, none of these proposals have been commercially successful and the general principle of propulsion has not been adopted as a practical proposition. This is thought to be due to the difficulty of successfully applying muscular energy to the pivoted flaps.

A different body of art in relation to water craft concerns the movement of such craft by means of reciprocating a fin like body which resembles the flukes of a whale or the oar used with Venetian gondolas. The following patent specifications are representative of this art.

U.S. Pat. No. 3,086,492 (HOLLEY)
U.S. Pat. No. 3,640,240 (STEIN)
U.S. Pat. No. 4,193,371 (BAULARD-CAUGAN)
U.S. Pat. No. 4,968,273 (MOMOT)
U.S. Pat. No. 6,595,813 (LEKHTMAN)
U.S. Pat. No. 6,755,706 (LIN)
GB 2,212,467A (WATKISS)

Again, to the best of the applicant's knowledge, none of these proposals have been commercially successful nor has the general principle of propulsion been adopted as a practical proposition. This is thought to be due to the difficulty of moving a sufficient volume of water by the movement of the fin or fluke.

The genesis of the present invention is a desire to see each of these hitherto separate, and commercially unsuccessful, proposals combined so is to each ameliorate the other's difficulties.

SUMMARY OF THE INVENTION

In accordance with a first aspect of the present invention there is disclosed an aquatic craft having a buoyant body, a frame located on said body above its waterline, pivoted relative to said body and movable in see-saw fashion by transfer of body weight of an operator, a resilient means interconnecting said frame and said body and arranged to return said frame to a rest position, an arm connected to said frame and reciprocated thereby and having a lower end which extends below said waterline, a pair of substantially rigid sheets pivoted about an axis defining an edge of each sheet, said sheets being located at or adjacent the lower end of said arm and being pivotable between a closed configuration in which said sheets are substantially abutting and a V-configuration, in which said sheets are inclined towards each other, and stop means adjacent said sheets to prevent pivotable movement of said sheets beyond said V-configuration wherein said body weight transfer reciprocates said sheets through the water in substantially the intended direction of travel whereby said water moves said sheets during each forward movement into said closed configuration and during each rearward movement into said V-configuration whereby the interaction of said sheets and water propels said craft forwardly.

In accordance with a second aspect of the present invention there is disclosed a method of propelling an aquatic craft through the water, said method comprising the steps of:
(i) pivoting a frame on said craft above the waterline and providing a resilient means connected between said frame and body to return said frame to a rest position,
(ii) connecting an arm to said frame to be reciprocated thereby and having an end extending below the waterline of said craft,
(iii) pivoting a pair of substantially rigid sheets about an axis defining an edge of each sheet, said sheets being pivotable between a closed configuration in which said sheets are substantially abutting and a V-configuration in which said sheets are inclined towards each other,
(iv) providing a stop means to prevent pivotal movement of said sheets beyond said V-configuration, and
(v) transferring the body weight of an operator to pivot said frame in see-saw fashion and thereby reciprocate said sheets through said water in substantially the intended direction of travel whereby said water moves said sheets during each forward movement into said closed configuration and during each rearward movement into said V-configuration whereby the interaction of said sheets and water propels said craft forwardly.

BRIEF DESCRIPTION OF THE DRAWINGS

Several embodiments of the present invention will now be described with reference to the drawings in which.

As seen in FIGS. 1–4, the water craft 10 of a first embodiment has twin hulls 11 which are separated and braced by a cross frame 12. The water craft 10 has a superstructure 14 located above the hulls 11 and which incorporates hand rails 15 which are able to be grasped by operator(s) and/or passenger(s). The superstructure 14 also includes a pivoted frame 17 having a platform 18 upon which an operator 20 stands. Beneath the platform 18 is a pivot 21 and a coil spring 22 which is positioned between the platform 18 and the cross frame 12. The function of the coil spring 22 is to return the platform 18 to its rest position.

Extending from the frame 17 and pivotable therewith is a pair of arms 25 each of which extends below the water line. Each arm 25 is preferably provided with lugs 26 to provide foot and/or hand holds to facilitate access to, or egress from, the water craft. At the lower end of each of the arms 25 is a pair of pivoted sheets 28, 29. The sheets 28, 29 are pivoted about an axis lying at the forward edge of each sheet 28, 29 and are pivotable between a substantially closed position illustrated in FIGS. 1 and 2 and a substantially open position illustrated in FIGS. 3 and 4.

Figure 5:
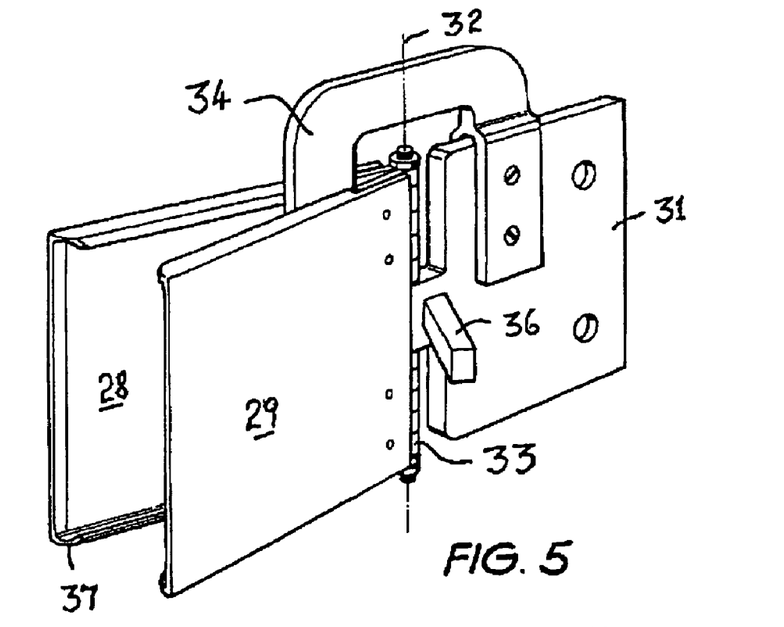
FIG. 5 is a perspective view of the pivoted sheet arrangement of the preferred embodiment with the sheets illustrated in a substantially closed position.
Figure 6:
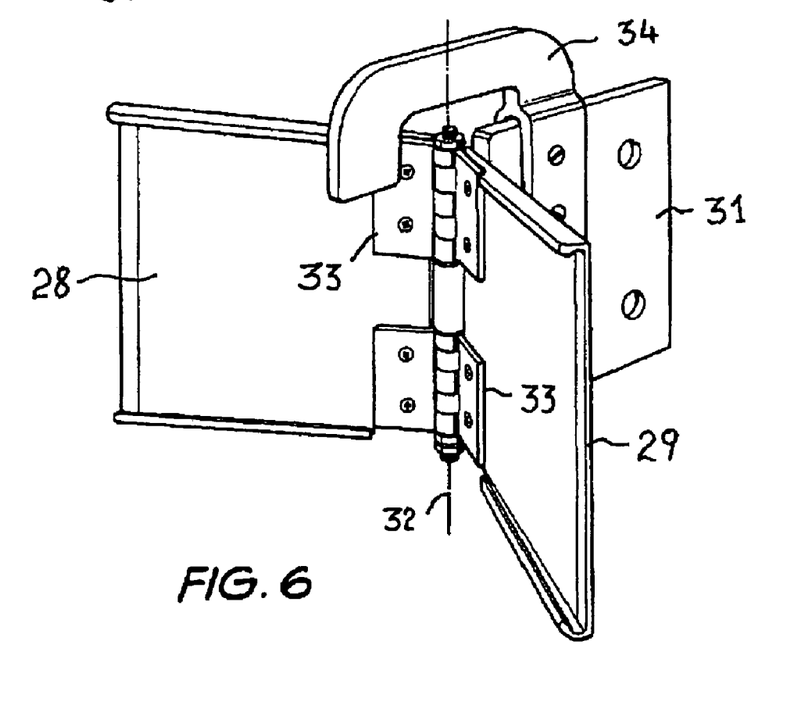
FIG. 6 is a perspective view similar to FIG. 5 but showing the sheets in a substantially open position.

The detail of the pivoted sheets 28, 29 is illustrated in FIGS. 5 and 6. A base plate 31 which is able to be attached to the arm 25, supports a hinge axis 32 and two hinges 33. A gooseneck 34 extends from the base plate 31 between the sheets 28, 29 in order to prevent their becoming fully closed. The base plate 31 also includes two stop arms 36 which limit the extent to which the two sheets 28, 29 can open as illustrated in FIG. 6. The sheets 28, 29 are also provided with upper and lower flanges 37 which limit the degree to which water can spill from the sheets 28, 29 as they move rearwardly through the water.

Figure 7:
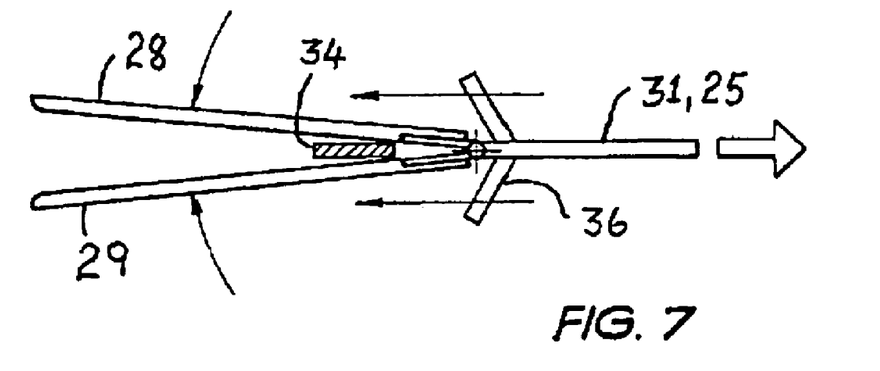
FIG. 7 is a schematic plan view showing the sheets in the configuration of FIG. 5.

Turning now to FIG. 7, it will be seen that as the arm 25 moves the sheets 28, 29 forwardly through the water, the pressure of the water on the outer surfaces of the sheets 28, 29 forces them to close against the gooseneck 34 as the arm 25 moves forwardly through the water.

Figure 8:
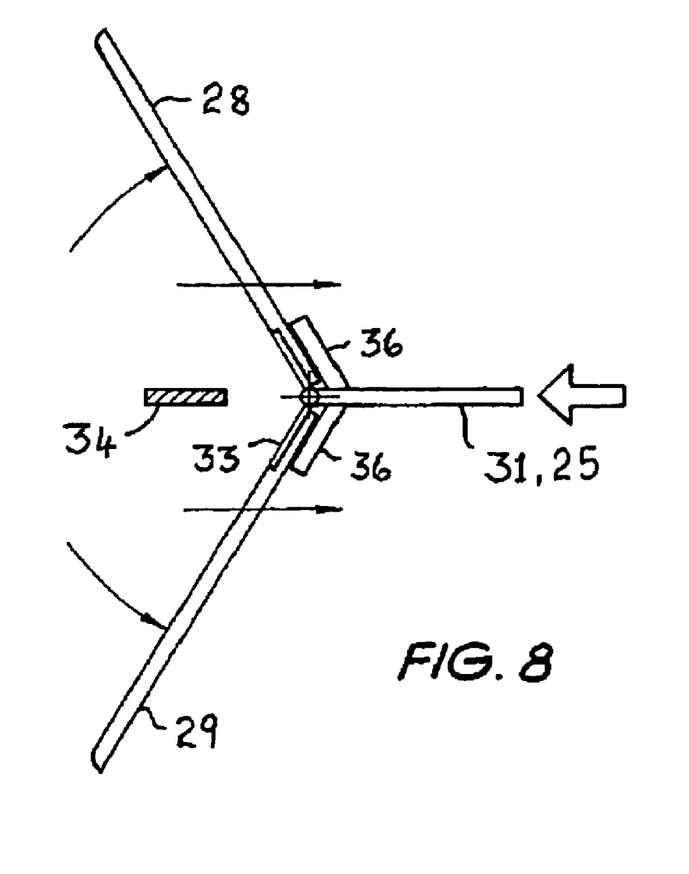
FIG. 8 is a schematic plan view similar to FIG. 7 but illustrating the sheets in the configuration of FIG. 6.

However, on the reverse stroke illustrated in FIG. 8, as the arm 25 tries to move rearwardly through the water, the sheets 28, 29 open to a maximum extent and abut the stop arms 36. In addition, the flanges 37 prevent water spilling over and under the pivoted sheets 28, 29. Consequently the sheets 28, 29 experience extreme resistance in moving through the water rearwardly as indicated in FIG. 8 with the consequence that the water craft 10 is propelled forwardly. It is desirable for the gooseneck 34 to be centrally aligned with the arm 25 so that firstly the sheets 28, 29 will be reliably opened by the movement of the sheets against the water, and secondly so that both sheets 28, 29 to not flop over to one side as a pair, and so not open, or not open efficiently.

Figure 1:
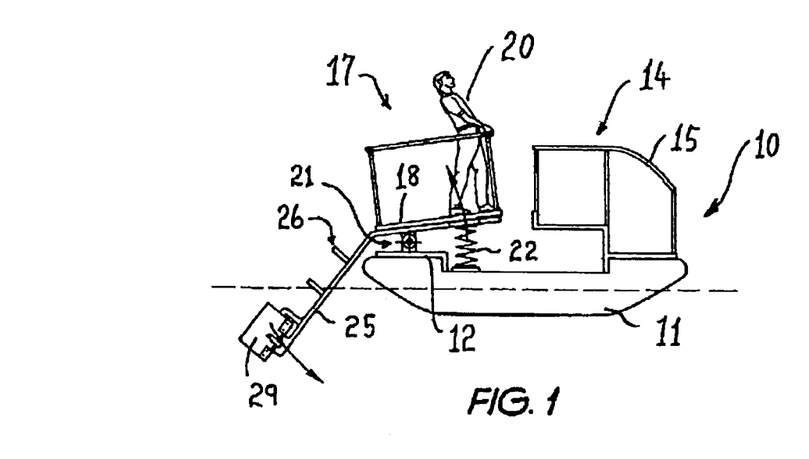
FIG. 1 is a side elevation of a water craft of a first embodiment.
Figure 2:
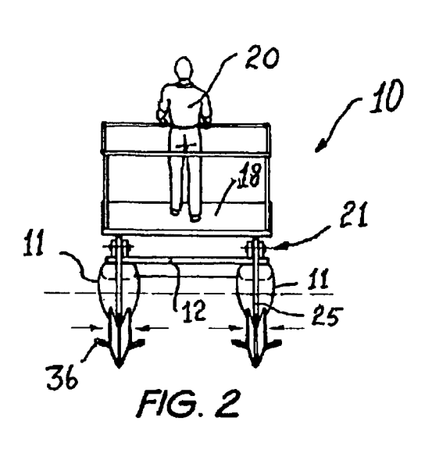
FIG. 2 is a rear view of the water craft of FIG. 1.
Figure 3:
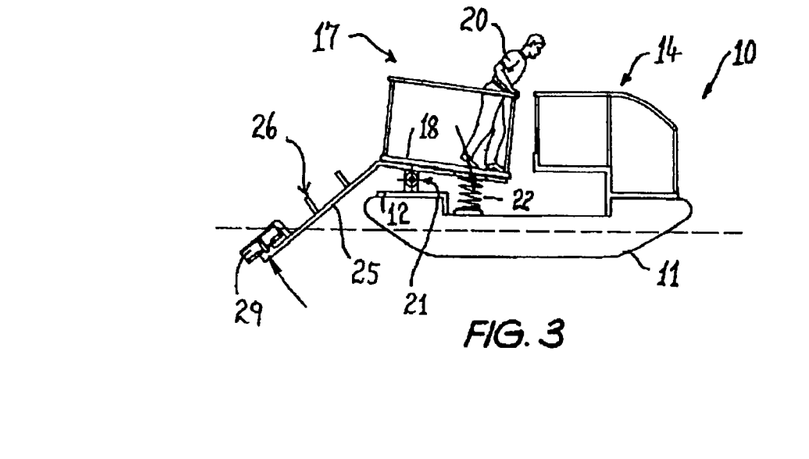
FIG. 3 is a view similar to FIG. 1 but illustrating the continued movement of the operator.
Figure 4:
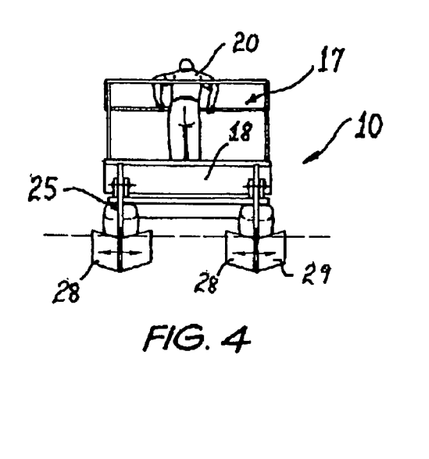
FIG. 4 is a view similar to FIG. 2 but illustrating the operator in the position illustrated in FIG. 3.

It will be appreciated that the to and fro rocking movement of the operator 20 as illustrated in FIGS. 1 and 3, reciprocates the arms 25 and thereby causes the pivoted sheets 28, 29 to repeatedly undergo the motions indicated in FIGS. 7 and 8. This has the consequence that the water craft 10 surges forward on each attempted rearward movement of the arms 25. It will be observed in this connection that the entire weight of the operator 20 is available to provide the propelling force and this results in considerable ergonomic efficiencies over and above traditional rowing arrangements with oars, for example. Not only is the entire weight of the operator 20 able to be utilised, but the level of exertion which the operator experiences is very low, and the propulsion force is not directly related to the muscular strength of the operator 20. All these factors provide substantial advantages, particularly in relation to the propelling of pleasure craft by inexperienced operators and/or operators who are not physically fit or not possessed of enduring stamina.

Figures 9, 10:
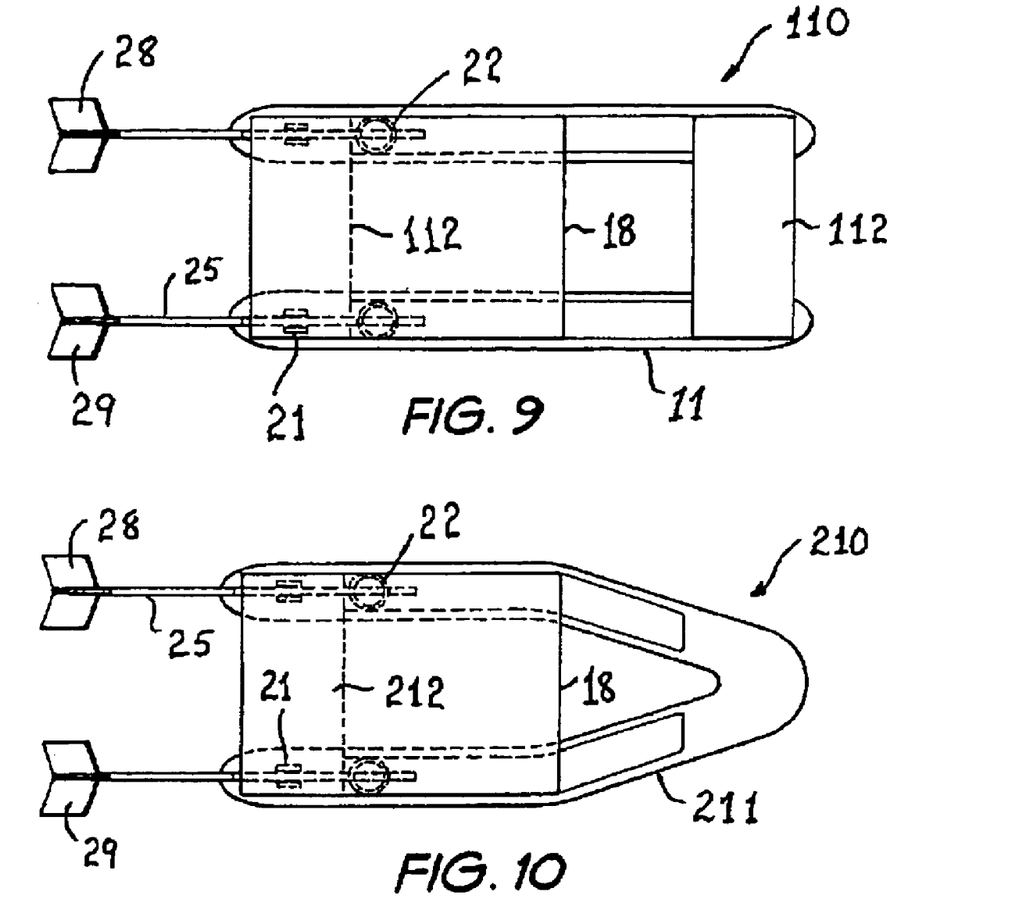
FIG. 9 is a plan view of a water craft of a second embodiment having a twin hull.
FIG. 10 is a plan view of another water craft having a V-shaped hull.
Figure 11:
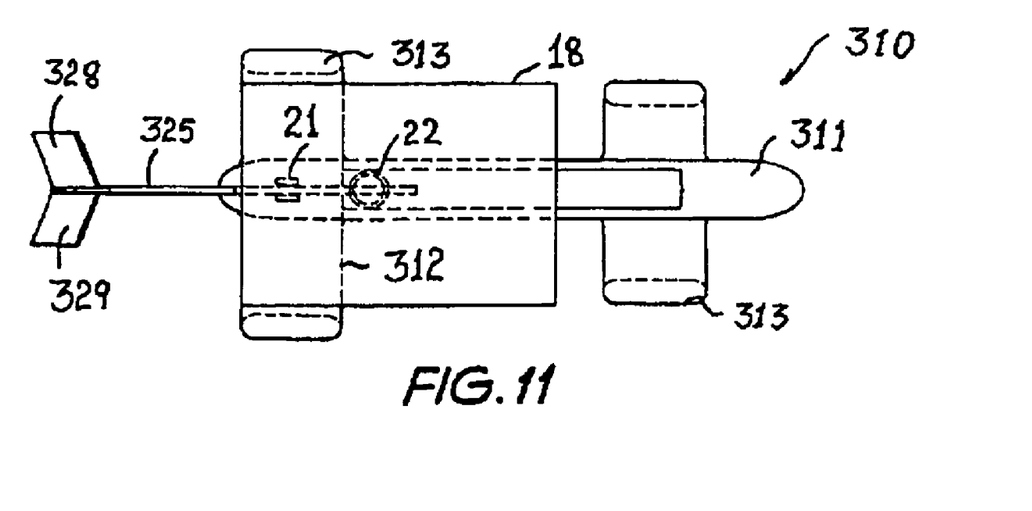
FIG. 11 is a plan view of still another water craft having a single hull with outriggers.

Turning now to FIGS. 9–11, three further water craft 110, 210 and 310 are respectively illustrated. The water craft 110 of FIG. 9 has twin hulls 11 as before, however, the cross frame arrangements 112 are different. In FIG. 10, the water craft 210 has a single V-shaped hull 211 and a single cross frame 212. In FIG. 11, the water craft 310 has a single hull 311 which is provided with outriggers 313.

For the water craft 110 and 210 of FIGS. 9 and 10, the pair of arms 25 are substantially as in FIGS. 1–8, however, in FIG. 11 the water craft 310 has only a single arm 325 and thus the pivoted sheets 328 and 329 are extended to provide an increased propelling force.

Figure 12:
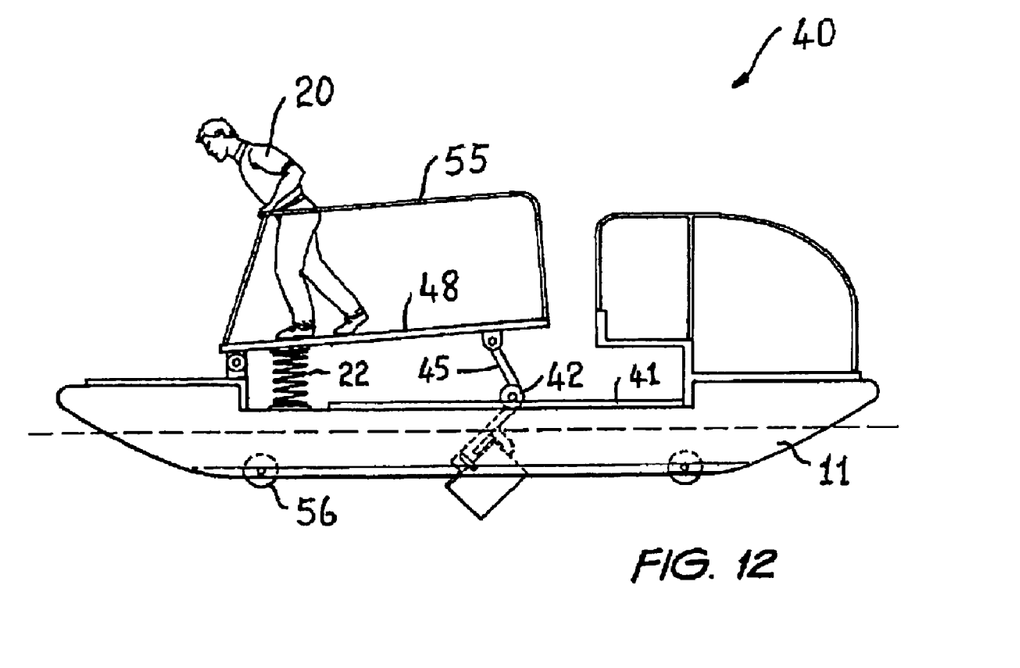
FIG. 12 is a side elevation of a further embodiment of a water craft in accordance with the present invention and having a modified propulsion system.
Figure 13:
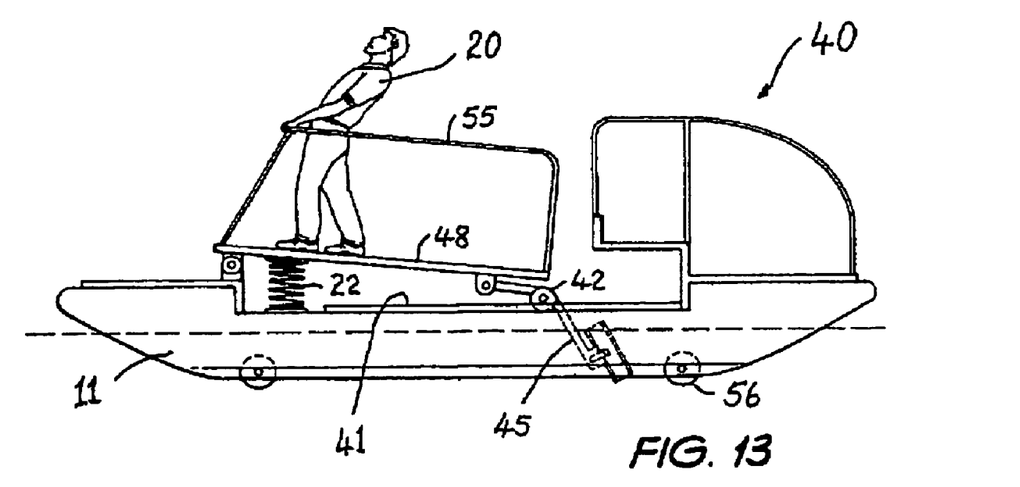
FIG. 13 is a side elevation similar to FIG. 12 but illustrating the continued movement of the operator.
Figure 14:
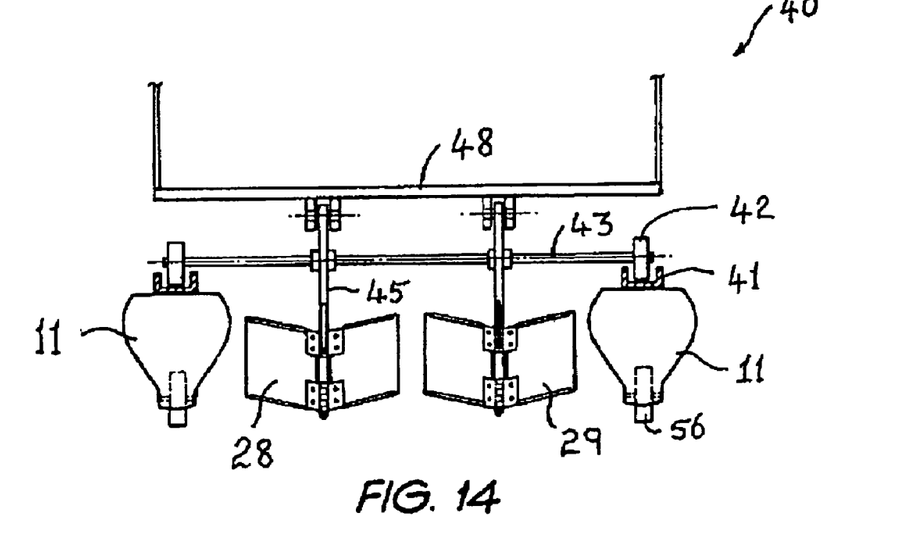
FIG. 14 is a partial rear view of the water craft of FIGS. 12 and 13 illustrating further details of the propulsion arrangement.
Figure 15:
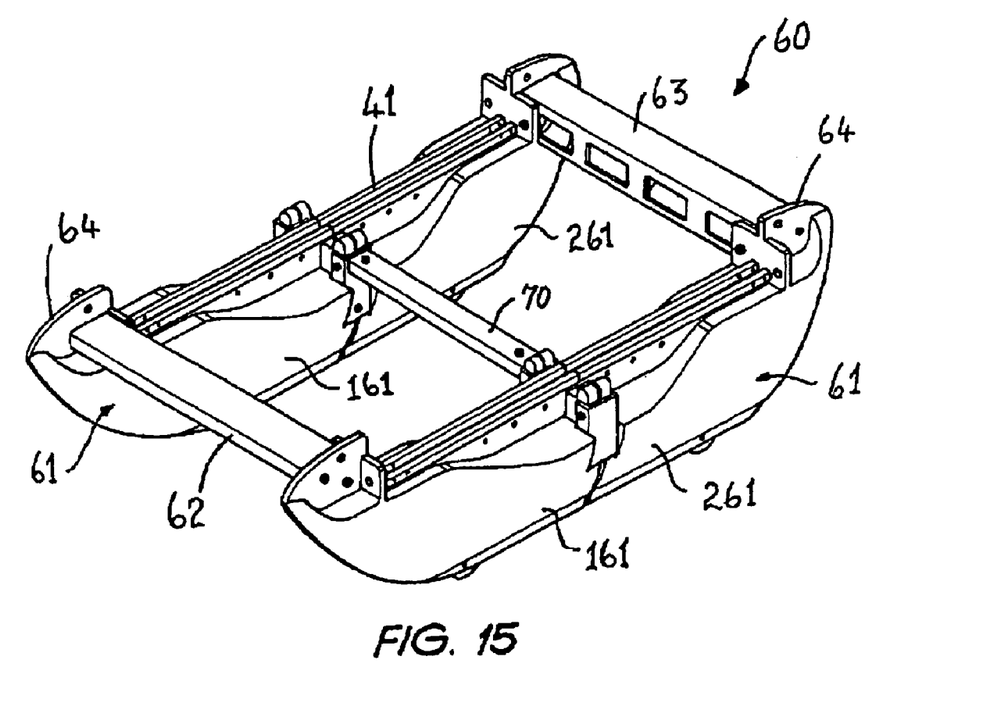
FIG. 15 is a perspective view from above of the twin hull structure of a still further water craft embodying the present invention.

Turning now to FIGS. 12–14, in this embodiment the water craft 40 has twin hulls 11 substantially as before with each hull 11 having a longitudinally extending U-shaped track 41 along which a corresponding wheel 42 rolls. Between the wheels 42 is an axle 43 upon which two bent arms 45 are pivoted. At the lower end of each of the bent arms 45 is a pair of sheets 28, 29 as before whilst at the upper end of each of the bent arms 45, the arm 45 is pivoted to the underside of a pivoted platform 48 biased by means of a coil spring 22 as before. The platform 48 is provided with a hand rail 55 which is grasped by the operator 20. Each of the hulls 11 is preferably provided with a pair of ground engaging wheels 56 which enable the water craft 40 to be wheeled onto a beach, loading ramp, or the like.

As before, the operator 20 shifts his weight fore and aft in order to reciprocate the platform 48 and thereby cause the wheels 42 to roll backwards and forwards along the U-shaped track 41. As before, this reciprocates the pivoted sheets 28, 29 through the water.

The main differences between the water craft 40 of FIGS. 12–14 and the water craft 10 of FIGS. 1–4 are the location of the pivoted sheets 28, 29 and the method of their reciprocation. A particular advantage of the arrangement of a water craft 40 is that the sheets 28, 29 are interior of the hulls 11 and do not protrude either fore or aft of the water craft.

Figure 16:
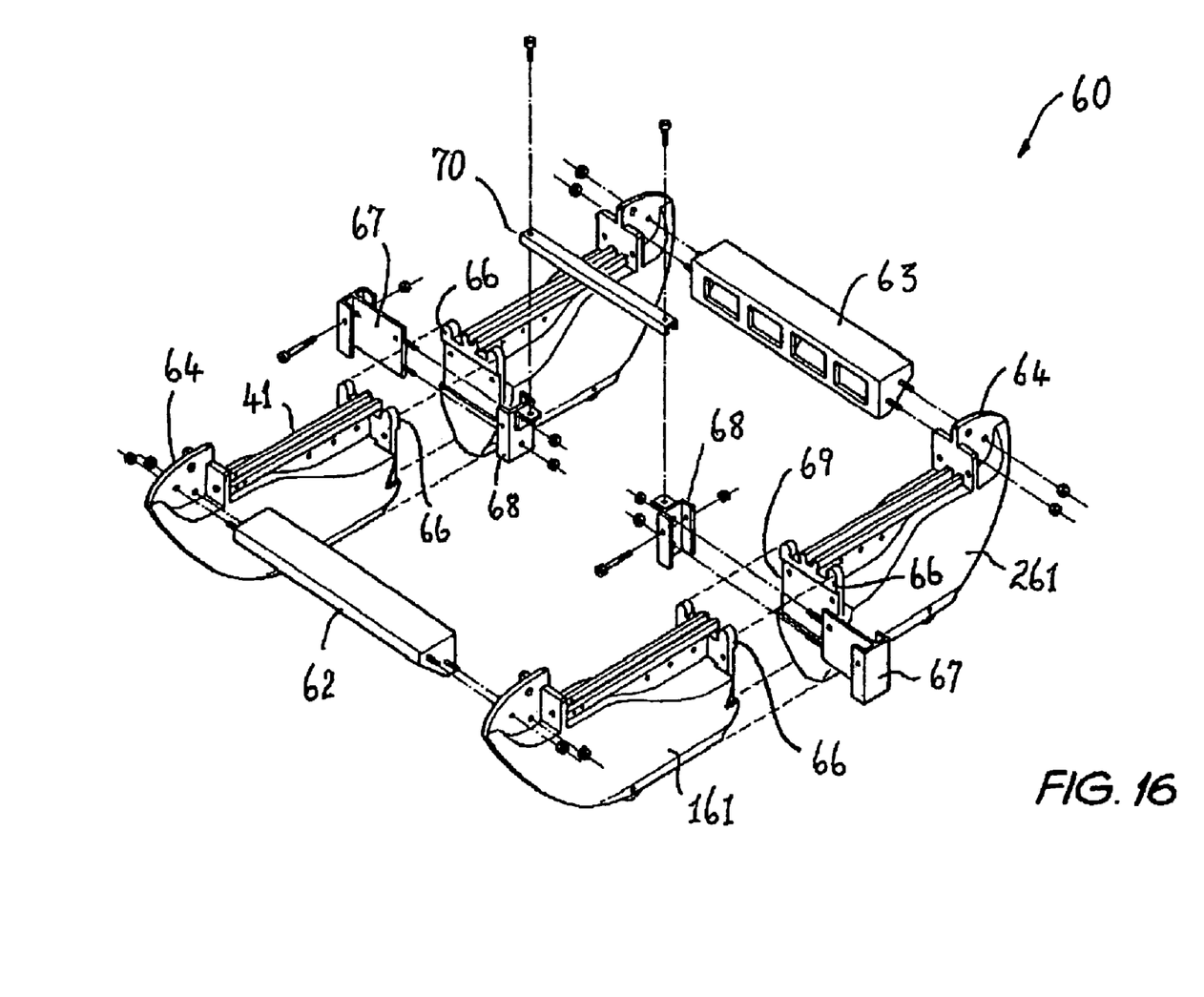
FIG. 16 is an exploded perspective view of the twin hull structure of FIG. 15.

Turning now to FIGS. 15–18, a particularly advantageous arrangement for a twin hulled water craft 60 is illustrated. In particular, the water craft 60 and its hulls 61 are able to be assembled from, and disassembled into, individual pieces which are able to be fitted inside the boot, trunk or interior passenger spaces of a motor vehicle. It will be seen from FIGS. 15 and 16 that each hull 61 is fabricated from a bow portion 161 and a stern portion 261. The hulls 61 are cross braced and strengthened by means of bow and stern transoms 62, 63 which, as indicated in FIG. 16, bolt to vertical webs 64 so as to form a snug and secure fitting.

The bow and stern portions of the hull 161, 261 each include an end plate 66. The end plates 66 abut each other and are held together by a clamping arrangement formed from a T-plate 67 and a U-receptor 68. The stem of the T-plate 67 is received in a corresponding groove 69 formed in the end plates 66. A cross brace 70 extends between the two U-receptors 68 to provide additional rigidity.

In order to assemble each hull 61 from its two hull halves 161, 162 the T-plate 67 is laid on the ground with its stern pointing upwardly. Each end plate 66 is then engaged with the head of the T-plate 67. Next, the U-receptor 68 is engaged with the end plates 66 and the projecting bolts of T-plate 67. Nuts and spring washers are used to draw the U-receptor 68 and T-plate 67 together. Preferably, the end plates 66 are slightly tapered being thicker towards the centre of the hull, thereby forming a tight joint as the T-plate 67 and U-receptor 68 are pulled together.

Figure 17:
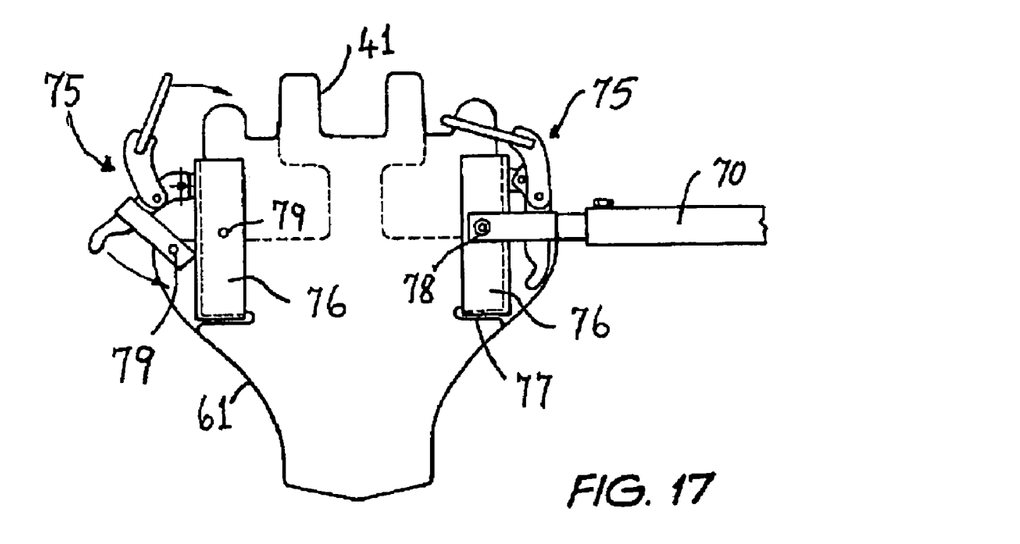
FIG. 17 is a side elevational view of the toggle latches used in the hull arrangement of FIGS. 16 and 17.
Figure 18:
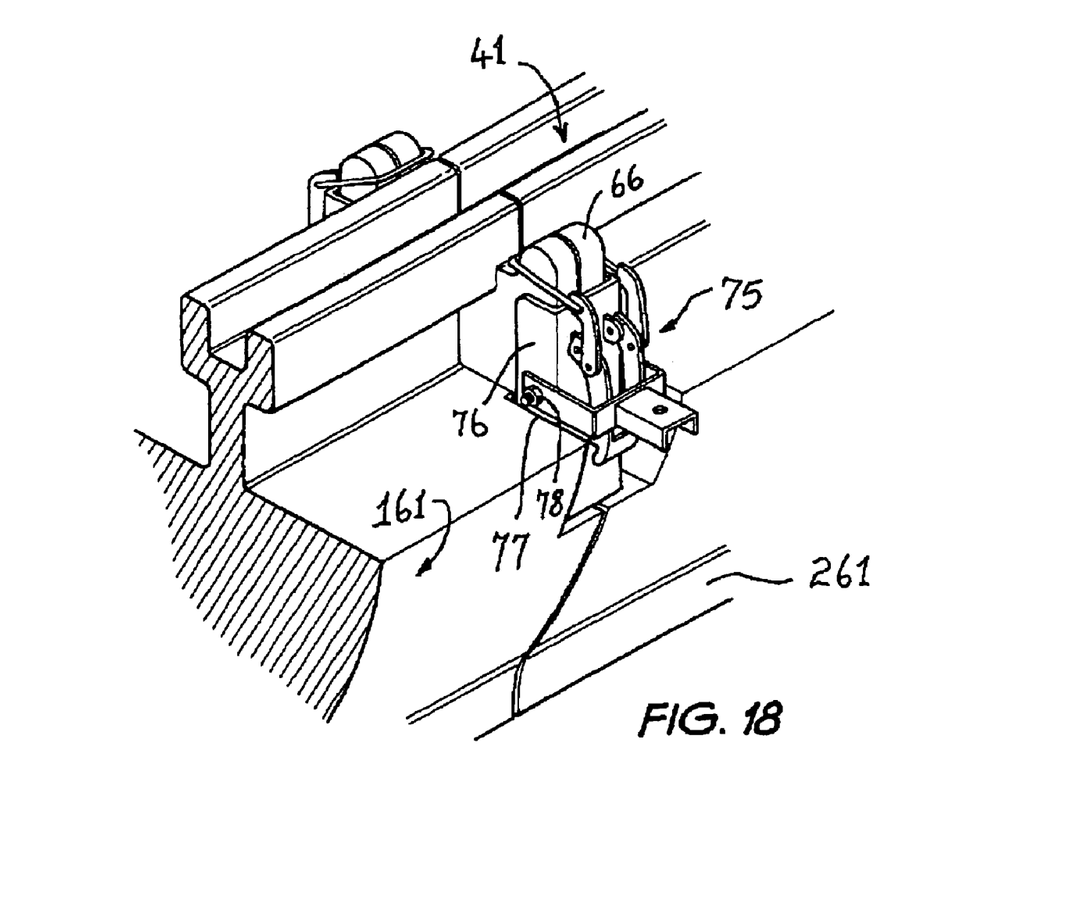
FIG. 18 is a perspective view of the toggle latches of FIG. 17.

As an alternative to the T-plates 67 and U-receptor 68, two overcentre toggle latches 75, as illustrated in FIGS. 17 and 18, can be provided. In this case, two U-channels 76, each closed at the lower end as illustrated in FIGS. 17 and 18 are engaged with the abutted end plates 66. In particular, the sides and closed end of each U-channel 76 engage with a corresponding groove 77 formed in the end plates 66. Again, a slight taper to the end plates 66 is provided so that the vertical drawing together provided by the latch action also produces a fore and aft clamping action on the end plates 66 because of the sides of the U-channels 76. Finally, a locking pin such as bolt 78 is passed through apertures 79 to maintain the latches 75 in the latched condition. It will also be apparent to those skilled in the art that, if desired, both the latches 75 and the T-plate and U-receptors 68 can be provided.

It will be apparent from FIGS. 15–18 that the hulls 61 each includes the U-shaped track 41 and that following assembly of the bow and stern hull portions 161, 261 the two tracks 41 are both aligned and the entire track is unobstructed. The bow hull portion 161 and the stern hull portion 261 are preferably formed from plastics by means of rotary moulding and the interior of each of the hull portions is preferably filled with expanded polystyrene so as to ensure that the hulls 61 are unsinkable.

Figure 19:
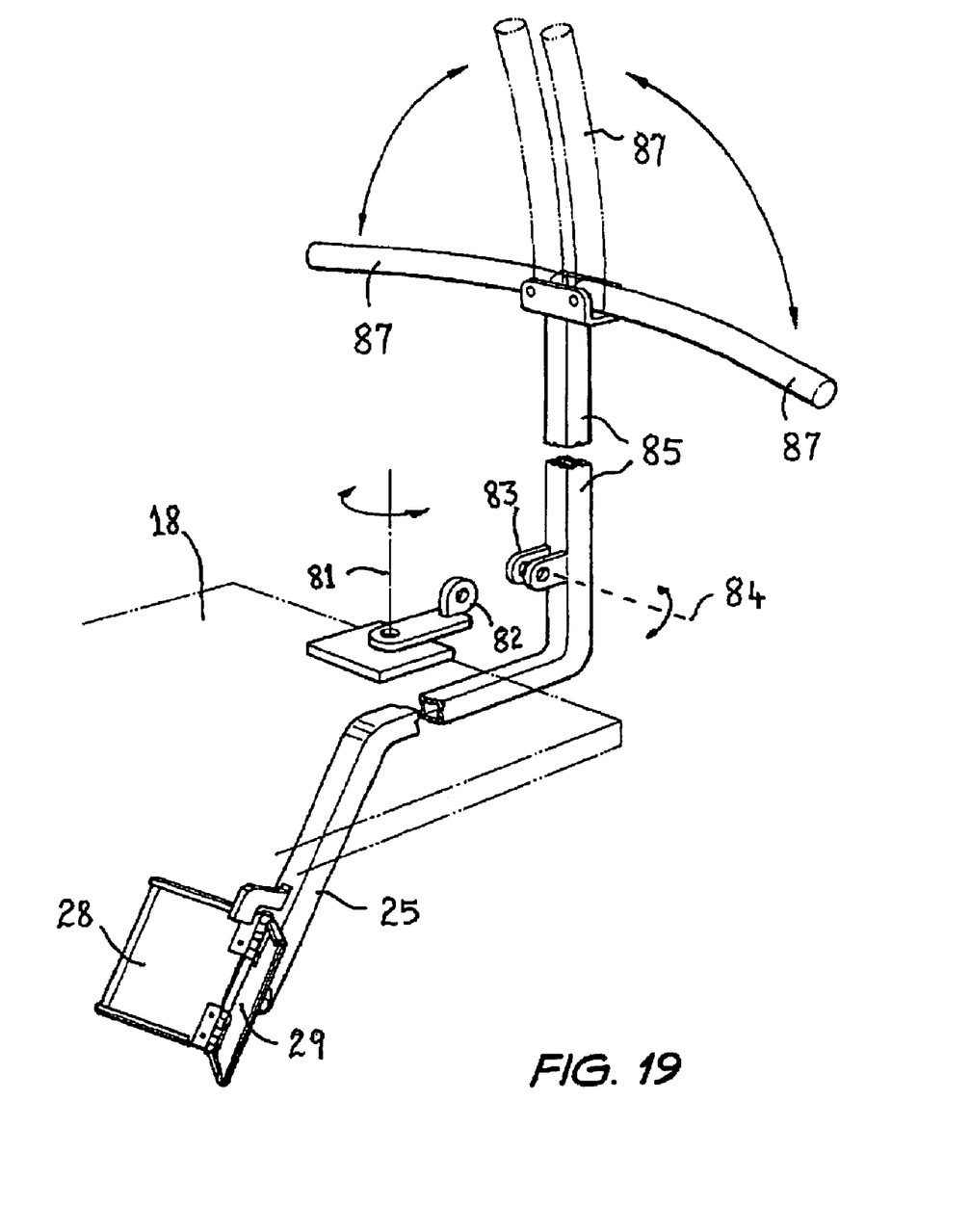
FIG. 19 is a schematic perspective view of an alternative propulsion arrangement which incorporates a steerage mechanism.

In FIG. 19 is illustrated an alternative propulsion arrangement which is applicable, for example, to the water craft 10 of FIG. 1. The platform 18 is shown in phantom and a kinked arm 25 passes underneath the platform 18 and has the pivoted sheets 28, 29 at its lower end. However, contrary to the arrangement illustrated in FIG. 1, the arm 25 in FIG. 19 is able to rotate relative to the platform 18 by means of a pivot 81 with a vertical axis of rotation. The pivot 81 is provided with a vertical apertured boss 82 which is received in a pair of apertured lugs 83 so that the entire arm 25 and its upstand 85 are able to rotate about a horizontal axis 84. The upstand 85 is also provided with a pair of handles 87 which are pivoted at their proximal ends. This enables the handles 87 to be moved into the vertical position illustrated in phantom in FIG. 19. In this elevated position operator movement to and from the platform 18 from and to the remainder of the superstructure 14 is able to be easily achieved. The handles 87 are preferably provided with a latch mechanism (not illustrated but conventional) which enables the handles 87 to be maintained in the substantially horizontal position illustrated in FIG. 19 so that any motion imparted by the operator 20 to the handles 87 is transmitted into the upstand 85. As before, a fore and aft rocking motion by the operator 20 on the platform 18 whilst holding the handles 87 results in the arm 25 being reciprocated in order to propel the craft 10. Furthermore, the upstand 85 can be rotated either clockwise or anti-clockwise through a limited arc utilising the pivot 81 thereby changing the compass heading of the direction of the thrust imparted by the propulsion mechanism. As a consequence, this rotation of the upstand 85 about the pivot 81 enables the craft 10 to be easily steered without the provision of a separate rudder.

Figure 20:
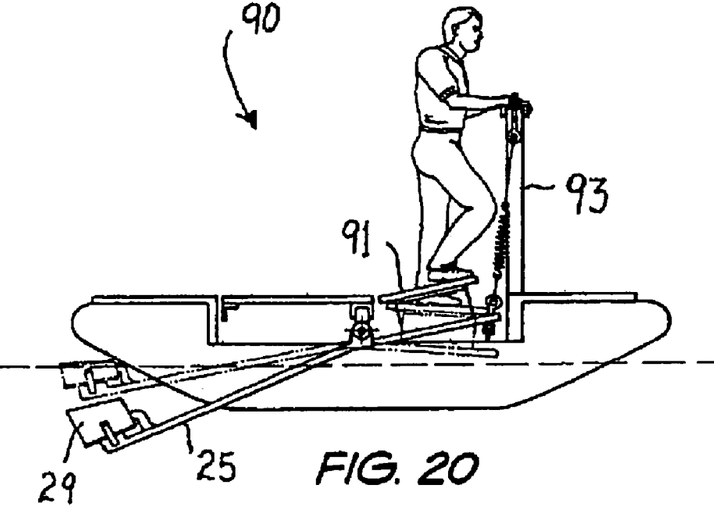
FIG. 20 is a side elevation of another embodiment of a water craft having a treadle propulsion system.
Figure 21:
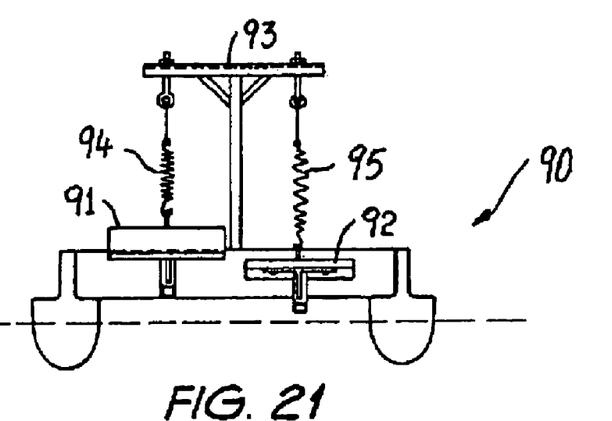
FIG. 21 is a schematic transverse cross-sectional view of the water craft of FIG. 20.
Figure 22:
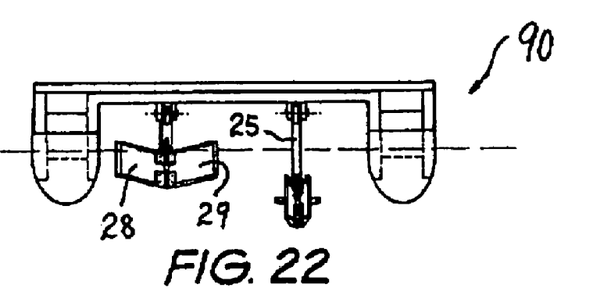
FIG. 22 is a schematic rear view of the water craft of FIG. 20, and FIGS. 23–25 are each a side elevation of yet another embodiment of a water craft which has a porpoise-like propulsion system.

Turning now to FIGS. 20–22, a still further water craft 90 having yet another propulsion system is illustrated. Here two arms 25 are provided before, save that the upper end of each arm is connected to a corresponding one of two treadles 91, 92 which are separated by a T-shaped upstand 93. Each treadle 91, 92 is connected to the T-shaped upstand 93 by means of a corresponding spring 94, 95 which acts to return the treadle 91, 92 to its uppermost position. An operator (not illustrated) by transferring his weight from one of the treadles 91, 92 to the other of the treadles can cause each of the treadles to reciprocate thereby reciprocating the arms 25 and propelling the water craft 90. In this connection the T-shaped upstand 93 provides a convenient handhold for the operator.

Figure 23:
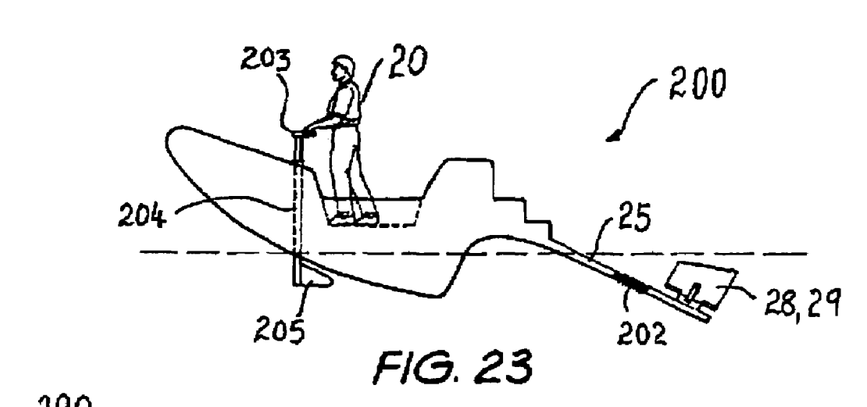
Figure 24:
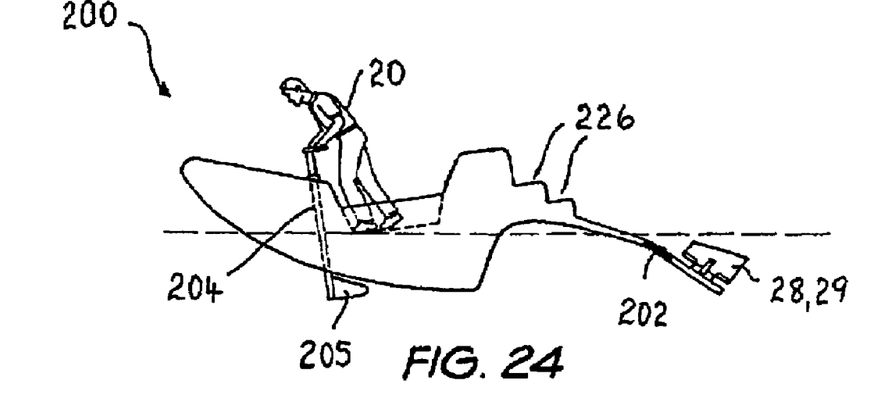
Figure 25:
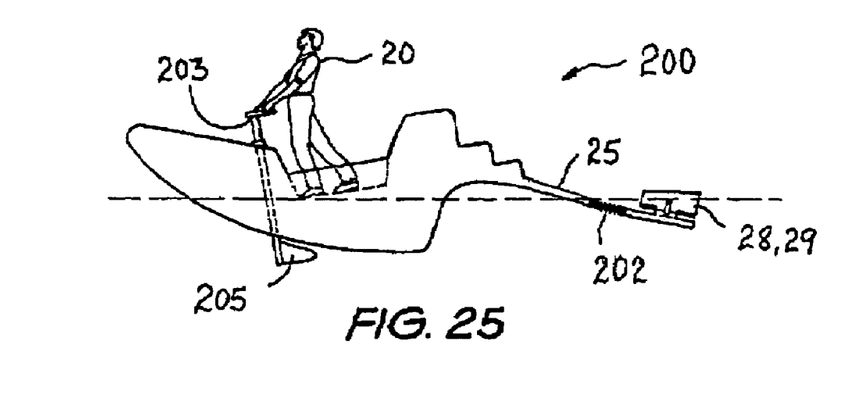

Finally, in relation to FIGS. 23–25, another embodiment of a water craft 200 is provided. The water craft 200 has a porpoise like propulsion system. Here the pivoted sheets 28, 29 are connected to a single fixed arm 25 by means of a relatively stiff coil spring 202. The operator 20 stands approximately above the centre of gravity of the water craft 200 and is able to grasp the handle grips of a tiller 203 which is connected via a rotatably mounted post 204 to a rudder 205. Steps 226 at the rear of the water craft 200 provide access and egress.

As illustrated in sequence in FIGS. 23–25, the operator 20 is able to rock fore and aft whilst holding the tiller 203 thereby causing the water craft 200 to "porpoise" so that in successive movements the bow falls and the stern rises and then the stern falls and the bow rises. This rocking movement reciprocates the pivoted sheets 28, 29 as before. If desired, the rudder 205 can be replaced by a set of steerable sheets 28, 29 in the manner described in FIG. 19. Thus these steerable sheets also contribute to the thrust.

The foregoing describes only some embodiments of the present invention and modifications, obvious to those skilled in the art, can be made thereto without departing from the scope of the present invention.

The term "comprising" (and its grammatical variations) as used herein is used in the inclusive sense of "having" or "including" and not in the exclusive sense of "consisting only of".

I claim:
1. An aquatic craft having a buoyant body, a frame located on said body above its waterline, pivoted relative to said body and movable in see-saw fashion by transfer of body weight of an operator, a resilient means interconnecting said frame and said body and arranged to return said frame to a rest position, an arm connected to said frame and reciprocated thereby and having a lower end which extends below said waterline, a pair of substantially rigid sheets pivoted about an axis defining an edge of each sheet, said sheets being located at or adjacent the lower end of said arm and being pivotable between a closed configuration in which said sheets are substantially abutting and a V-configuration, in which said sheets are inclined towards each other, and stop means adjacent said sheets to prevent pivotable movement of said sheets beyond said V-configuration wherein said body weight transfer reciprocates said sheets through the water in substantially the intended direction of travel whereby said water moves said sheets during each forward movement into said closed configuration and during each rearward movement into said V-configuration whereby the interaction of said sheets and water propels said craft forwardly.

2. The craft as claimed in claim 1 wherein said frame comprises a platform upon which an operator can stand.

3. The craft as claimed in claim 1 wherein said frame is pivoted adjacent one end thereof.

4. The craft as claimed in claim 3 wherein said arm is secured to said frame and pivotable therewith.

5. The craft as claimed in claim 3 wherein said arm is connected to said frame by a mechanical linkage.

6. The craft as claimed in claim 5 wherein said mechanical linkage includes a track, and a wheel which reciprocates in said track and supports a pivot for said arm.

7. The craft as claimed in claim 1 wherein each said sheet includes at least one peripheral flange to retain water when said sheets are in said V-configuration.

8. The craft as claimed in claim 7 having a pair of opposed said flanges.

9. The craft as claimed in claim 7 wherein an anti-closure means is positioned between said sheets to prevent said sheets abutting in said closed configuration.

10. The craft as claimed in claim 9 wherein said anti-closure means is substantially centrally located between said sheets.

11. The craft as claimed in claim 1 wherein said buoyant body comprises a hull able to be assembled from, and dis-assembled into, a plurality of component parts.

12. The craft as claimed in claim 11 wherein said buoyant body comprises twin hulls and said reciprocable arm is located therebetween.

13. The craft as claimed in claim 1 wherein said arm is pivotal about a substantially vertical axis relative to said body to thereby steer said craft.

14. The craft as claimed in claim 1 wherein said frame comprises a pair of treadles.

15. The craft as claimed in claim 1 and including step means providing access to said craft.

16. A method of propelling an aquatic craft through the water, said method comprising the steps of:
   (i) pivoting a frame on said craft above its waterline and providing a resilient means connected between said frame and body to return said frame to a rest position,
   (ii) connecting an arm to said frame to be reciprocated thereby and having an end extending below the waterline of said craft,
   (iii) pivoting a pair of substantially rigid sheets about an axis defining an edge of each sheet, said sheets being pivotable between a closed configuration in which said sheets are substantially abutting and a V-configuration in which said sheets are inclined towards each other,
   (iv) providing a stop means to prevent pivotal movement of said sheets beyond said V-configuration, and
   (v) transferring the body weight of an operator to pivot said frame in see-saw fashion and thereby reciprocate said sheets through said water in substantially the intended direction of travel whereby said water moves said sheets during each forward movement into said closed configuration and during each rearward movement into said V-configuration whereby the interaction of said sheets and water propels said craft forwardly.

17. The method as claimed in claim 16 including the further step of:
   (vi) standing on said frame to pivot same.

18. The method as claimed in claim 16 including the further step of:
   (vii) pivoting said arm relative to the direction of travel to steer said craft.

19. The method as claimed in claim 18 including the further step of:
   (viii) preventing said sheets abutting in said closed configuration.

20. The method as claimed in claim 16 including the further step of:
   (ix) locating said reciprocable arm between twin hulls.

* * * * *